Patented Jan. 28, 1947

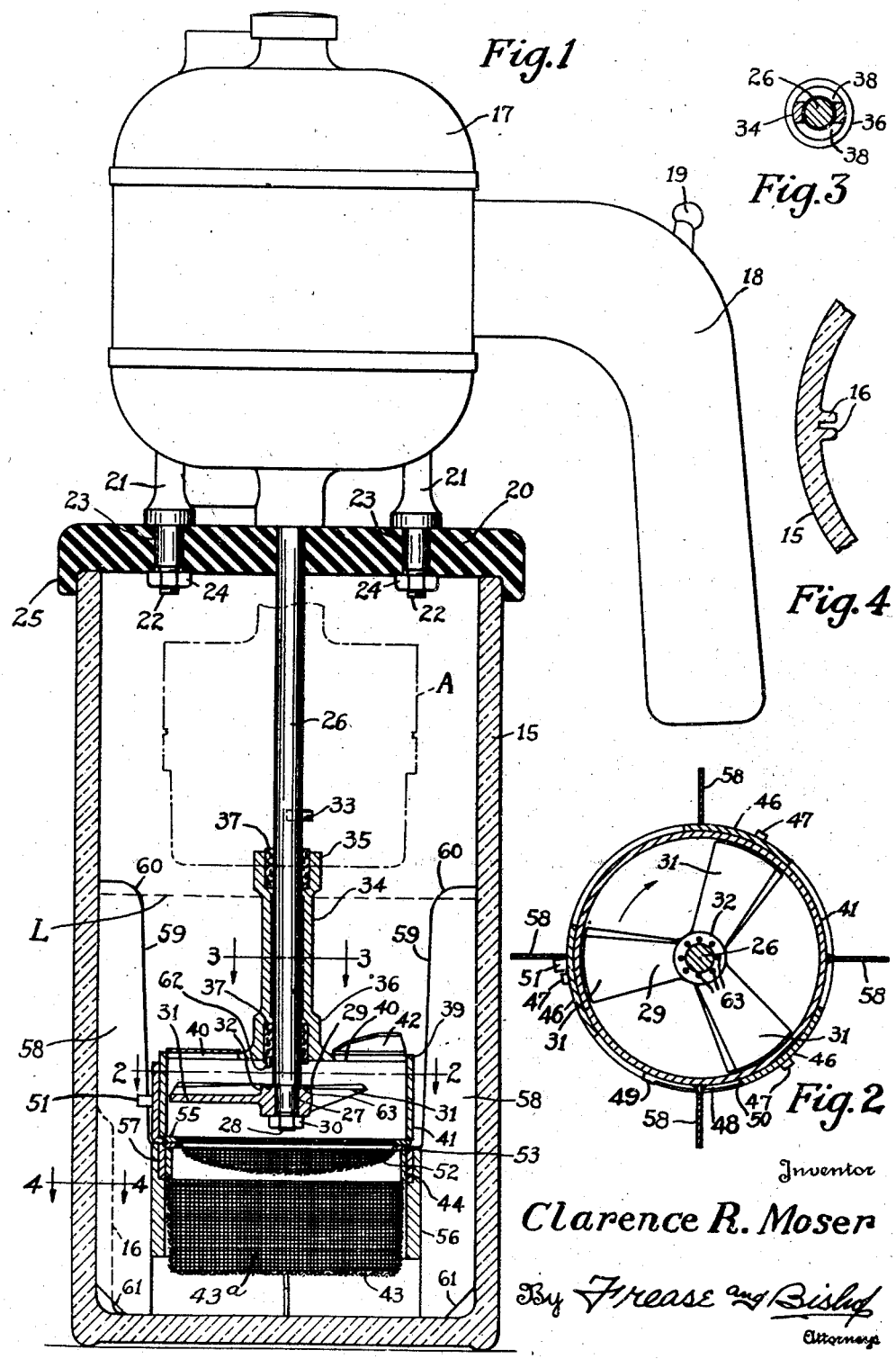

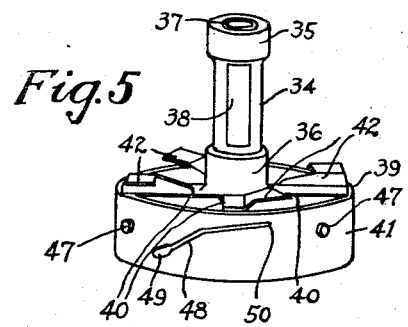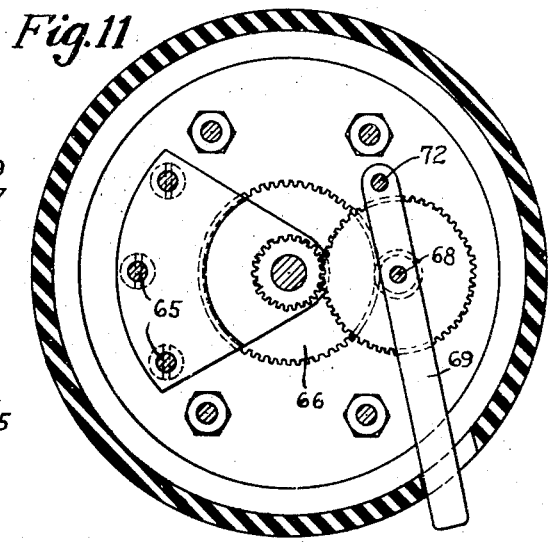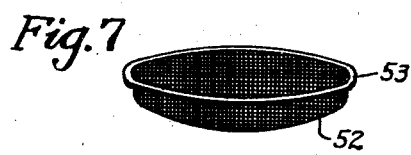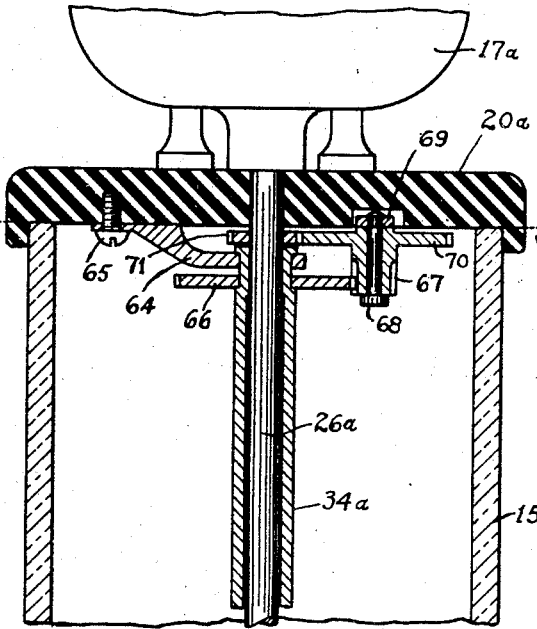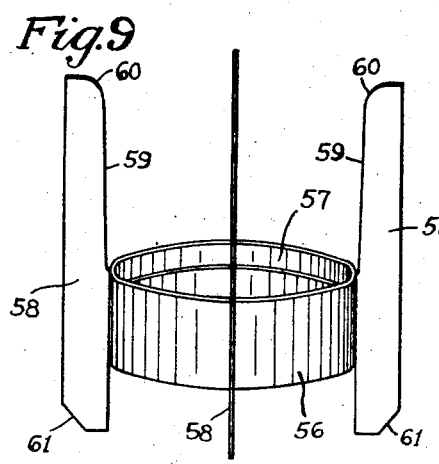

2,414,971

UNITED STATES PATENT OFFICE 2,414,971

CLEANING MACHINE

Clarence R. Moser, Orrville, Ohio

Application July 8, 1944, Serial No. 544,005

19 Claims. (Cl. 134—112)

The invention relates in general to cleaning machines and more particularly to a machine of this character especially adapted for cleaning small objects such as the parts of watches and clocks.

Machines for this purpose such as are now in general use include a receptacle containing cleaning fluid, a perforate basket for holding the small parts to be cleaned and means for rotating the basket at a high speed within the cleaning fluid.

Such machines are not entirely satisfactory as considerable time is required for each cleaning operation and since no means is provided for producing a forced circulation of the cleaning fluid through the basket and around the parts to be cleaned it frequently happens that the parts are not thoroughly cleaned.

It is an object of the present invention to provide a cleaning machine in which a forced circulation of cleaning fluid is produced through the basket and around the parts to be cleaned whereby the cleaning operation may be considerably shortened and the parts thoroughly cleaned.

Another object is to provide a cleaning machine of this character in which the motor shaft has an impeller fixed upon its lower end, and a sleeve is journalled around the shaft and provided with means surrounding the impeller for detachably connecting the basket below the impeller.

A further object is to provide means for operatively connecting the sleeve to the shaft so that the basket may be rotated to centrifugally dry the parts therein when the basket is raised out of the cleaning fluid.

A still further object is to provide such a cleaning machine in which the sleeve carrying the basket will be automatically operatively connected to the impeller shaft when the basket is raised out of the cleaning fluid and automatically disengaged from the shaft when the basket is lowered into the fluid.

It is another object of the invention to provide a machine of the character referred to in which the sleeve is longitudinally slidable upon the shaft and cooperating clutch members are provided upon the shaft and sleeve.

Another object is to provide a stand in the bottom of the liquid receptacle to support the basket in stationary condition.

Still another object is to provide radial vanes around the exterior of the basket stand to prevent the cleaning fluid from being swirled around in the receptacle due to the action of the impeller.

A further object is to provide a cleaning machine of this character with means for operatively connecting the sleeve to the shaft so that the sleeve is driven at a considerably slower speed than the shaft.

A still further object is to provide such a cleaning machine in which a cylindric casing surrounds the impeller, the basket being detachably connected to the lower end of the casing and openings being formed in the top of the casing with angular vanes for deflecting the cleaning fluid to the impeller.

Another object of the invention is to provide a cleaning machine of the character referred to in which means is provided on the inside of the fluid receptacle for engaging the radial vanes on the stand to prevent rotation of the stand and basket when the impeller is rotated.

The above objects together with others which will be apparent from the drawings and following detail description, or which may be later referred to, may be attained by constructing the improved cleaning machine in the manner illustrated in the accompanying drawings, in which:

Figure 1 is a vertical, sectional view of a cleaning machine embodying the invention, showing the same in position for cleaning;

Fig. 2 a transverse section through the impeller housing, taken on the line 2—2, Fig. 1;

Fig. 3 a section through the motor shaft and sleeve, taken on the line 3—3, Fig. 1;

Fig. 4 a fragmentary section through the fluid receptacle showing the ribs for engaging one of the radial vanes of the stand, taken on the line 4—4, Fig. 1;

Fig. 5 a perspective view of the sleeve and impeller housing;

Fig. 6 a perspective view of the cover for the basket;

Fig. 7 a perspective view of the inner basket for small parts;

Fig. 8 a perspective view of the basket;

Fig. 9 a perspective view of the stand for the basket;

Fig. 10 a fragmentary, vertical sectional view of a slightly modified form of the invention showing a gear reduction between the shaft and sleeve, and Fig. 11 a transverse sectional view taken on the line 11—11, Fig. 10.

The cleaning machine includes a plurality of similar receptacles for containing various kinds of cleaning fluid to be used successively as in usual practice, one of these receptacles being shown at 15. Each of these receptacles may be substantially cylindric in shape with a spaced pair of vertical ribs 16 upon the inner wall in the lower end thereof, or the receptacle may be square in cross section, for a purpose to be later explained.

An electric motor of any usual and well known design, and mounted upon a vertical axis, is indicated generally at 17 and may be provided with a pistol grip handle 18 by means of which the motor, and parts carried thereby, may be manually moved from one receptacle to another during the cleaning operation. A switch button 19 is provided upon the handle for convenient operation of the switch which controls the motor.

A cover for the receptacle formed of any suitable material such as hard rubber, plastic, wood or the like as indicated at 20 may be fixed to the lower end of the motor as by the lugs 21 with screw threaded terminal ends 22 located through suitable openings 23 in the cover, and nuts 24 upon said threaded terminals. A depending flange 25 may be formed upon the cover 20 for engaging over the upper open end of the receptacle 15.

The shaft 26 of the motor is of substantial length and the lower end thereof is shouldered as at 27 and screw threaded as at 28 to receive the impeller indicated generally at 29, a nut 30 being placed upon the screw threaded terminal of the shaft for clamping the impeller rigidly upon the shaft.

The impeller may be of any suitable type for effecting circulation of the cleaning fluid over and around the objects to be cleaned, a screw type impeller with three inclined blades 31 being illustrated.

Slidably mounted upon the lower portion of the shaft 26, between the impeller hub 32 and the stop pin 33, is a sleeve 34 preferably having the enlarged thimbles 35 and 36 at its upper and lower ends respectively to receive bushings 37 which may be formed of any suitable material. The sleeve 34 is preferably cut away on opposite sides as indicated at 38 in order to quickly drain cleaning fluid therefrom when the device is removed from the fluid.

A housing 39 is mounted upon or formed integrally with the lower end portion of the sleeve 34 and comprises the radial ribs 40 and the depending cylindrical side wall 41, the lower end of said housing being open. Angular vanes 42 are mounted upon the ribs 40 and arranged to direct the fluid downward into the housing when the impeller is operated.

The article supporting means may comprise a basket indicated generally at 43, for containing the watch parts or other articles to be cleaned, including a reticulated, cup shaped article receptacle 43a which may be formed of wire mesh or the like and provided at its upper end with a ring frame 44 having spaced upwardly disposed flanges 45 thereon provided with the angular tapered fingers 46 adapted to be received around the cylindrical wall 41 of the impeller housing and to engage over the studs 47 thereon so as to detachably connect the basket to the impeller housing.

A locking spring 48 may be fixed at one end, as at 49, to the exterior of the cylindrical wall 41 of the impeller housing as by welding, brazing or the like, the free end 50 of the spring being adapted to engage an edge of one of the flanges 45 of the basket in order to lock the basket upon the housing, the stud 51 upon the basket contacting one of the vanes 58 of the stand and holding the basket against rotation.

For the purpose of segregating small, delicate parts such as the hair spring, balance post and the like, a separate inner basket 52 may be provided to be placed in the top of the main basket 43, a ring frame 53 being formed upon the smaller basket to rest upon the top of the ring frame 44 of the main basket. A reticulated cover 54 is provided for the basket and has a ring frame 55 adapted to rest upon the ring frame 53 of the smaller basket, the two ring frames 53 and 55 being clamped between the ring frame 44 of the main basket and the peripheral flange 41 of the impeller housing as shown in Fig. 1.

A stand may be provided in the lower portion of the fluid receptacle to support the basket 43 in stationary position when the impeller is operated. This stand may comprise a cylindric frame 56 open at both ends and shouldered at its upper end as at 57 to receive the ring frame 44 of the basket 43 and is provided with a plurality of radial vanes 58 around its periphery adapted to fit within the interior of the receptacle 15, one of said vanes being received between the spaced ribs 16 of the receptacle to prevent rotation of the stand within the receptacle, due to the motion of the impeller.

The inner edges of the vanes 58 are preferably outwardly inclined as at 59 and terminate in the rounded upper ends 60 to facilitate insertion of the basket into the frame. The lower outer corners of the vanes may be cut away as at 61 so as to permit the vanes to rest upon the bottom wall of the receptacle 15.

In the operation of the machine the receptacle 15 is filled with cleaning fluid to about the level indicated at L. The basket is assembled upon the impeller housing with the watch parts to be cleaned within the basket, and the cover 20 is placed upon the receptacle with the basket supported within the stand 56, as shown in Fig. 1.

The motor is then started to operate the impeller which draws the cleaning fluid down through the open top of the impeller housing and forces it down through the basket, around and over the watch parts therein. The vanes 58 upon the stand prevent the cleaning liquid from swirling around within the receptacle and cause it to be continuously circulated upward around the stand and between the vanes as it is forced down through the basket by the impeller, thus rapidly and efficiently cleaning the watch parts or other small articles in the basket.

When the parts have been thoroughly cleaned the motor is stopped and is raised by the pistol grip 18 until the impeller housing and basket are moved to the dotted line position indicated at A in Fig. 1 above the liquid level. As the motor is raised the shaft 26 will slide upwardly in the sleeve 34 until the hub 32 of the impeller contacts the lower end of the sleeve so that further upward movement of the shaft will carry the impeller housing and basket assembly upwardly therewith.

Clutch mechanism is provided for operatively connecting the sleeve 34 to the impeller at this point. This clutch mechanism may comprise a pin 62 extending downwardly from the sleeve or the lower bushing 37 thereof and arranged to engage any one of a plurality of holes 63 in the impeller hub.

When the parts are raised to the position shown in broken lines at A in Fig. 1 the motor is again operated and as the sleeve is thus operatively connected to the impeller the impeller housing and basket will be rotated with the shaft, centrifugally drying the cleaned parts.

The operation may be repeated in one or more similar receptacles containing various kinds of cleaning fluid until all of the parts are properly cleaned and dried.

In Figs. 10 and 11 is shown a slightly modified form of the invention adapted to rotate the basket at considerably slower speed than the shaft, when it is desired to centrifugally dry the cleaned clock parts and the like.

In this form of the invention the motor 17a, receptacle 15a, receptacle cover 20a and shaft 26a may all be of the same construction and arrangement as above described. The impeller, impeller housing, basket assembly, basket supporting stand, etc. may all be of the same construction as illustrated and described with reference to Figs. 1 to 9 inclusive and therefore these parts are not illustrated in connection with the form of the invention shown in Figs. 10 and 11.

The sleeve 34a is not slidable upon the shaft but is rotatable thereto and is journalled at its upper end in a bracket 64 connected to the under side of the cover 20a as by the screws 65. A gear 66 is fixed upon the sleeve and meshes with a pinion 67 journalled upon a shaft 68 carried by the lever 69. A gear 70 is fixed to the pinion 67 and arranged to mesh with a pinion 71 fixed upon the shaft 26a. The lever 69 is pivoted upon the cover 20a as at 72 and is manually swung to a position to disengage the pinion 67 and gear 70 from the gear 66 and pinion 71 upon the shaft receptacle, while the parts are being cleaned in the fluid. In this form of the invention the basket may be received in the stand in the manner shown in Fig. 1, but since the basket is actually supported through the sleeve 34a by the bracket 64, the stand is not required to support the basket but merely to hold the basket against rotation within the receptacle.

However when the basket and impeller housing are raised above the level of the cleaning fluid the lever 69 is moved to the position shown in Figs. 10 and 11 operatively connecting the sleeve 34a to the shaft 26a through the reduction gearing described causing the sleeve 34a and the basket carried thereby to be rotated at a considerably less speed than the shaft.

Instead of using a cylindrical receptacle a square receptacle may be used for containing the cleaning fluid in which case the vanes 58 fit into the four corners of the receptacle preventing rotation of the stand and basket assembly within the receptacle due to the action of the impeller.

I claim:

1. A cleaning machine comprising a receptacle for holding liquid, a vertical shaft located in said receptacle, an impeller upon the lower end of the shaft, a sleeve longitudinally slidable and rotatable upon the shaft above the impeller, means fixed upon the sleeve surrounding the impeller, cooperating clutch members upon the sleeve and the shaft, a reticulated basket for supporting articles to be cleaned, means for detachably connecting the basket to said means fixed upon the sleeve, supporting means in the lower portion of the receptacle for supporting the basket in position to hold said clutch members out of engagement and means for rotating the shaft.

2. A cleaning machine comprising a receptacle for holding liquid, a motor, a cover for the receptacle fixed to the lower end of the motor, a shaft upon the motor located within the receptacle, an impeller upon the lower end of the shaft, a sleeve longitudinally slidable and rotatable upon the shaft above the impeller, means fixed upon the sleeve surrounding the impeller, cooperating clutch members upon the sleeve and the shaft, a reticulated basket for supporting articles to be cleaned, means for detachably connecting the basket to said means fixed upon the sleeve and supporting means in the lower portion of the receptacle for supporting the basket in position to hold said clutch members out of engagement.

3. A cleaning machine comprising a receptacle for holding liquid, a vertical shaft located in said receptacle, an impeller upon the lower end of the shaft, a sleeve longitudinally slidable and rotatable upon the shaft above the impeller, a housing upon the sleeve surrounding the impeller, cooperating clutch members upon the sleeve and the shaft, a reticulated basket for supporting articles to be cleaned, means for detachably connecting the basket to said housing, supporting means in the lower portion of the receptacle for supporting the basket in position to hold said clutch members out of engagement and means for rotating the shaft.

4. A cleaning machine comprising a receptacle for holding liquid, a vertical shaft located in said receptacle, an impeller upon the lower end of the shaft, a sleeve longitudinally slidable and rotatable upon the shaft above the impeller, a housing upon the sleeve surrounding the impeller, said housing being open at its top and bottom and having inclined vanes at its upper end, cooperating clutch members upon the sleeve and the shaft, a reticulated basket for supporting articles to be cleaned, means for detachably connecting the basket to said housing, supporting means in the lower portion of the receptacle for supporting the basket in position to hold said clutch members out of engagement and means for rotating the shaft.

5. A cleaning machine comprising a receptacle for holding liquid, a motor, a cover for the receptacle fixed to the lower end of the motor, a shaft upon the motor located within the receptacle, an impeller upon the lower end of the shaft, a sleeve longitudinally slidable and rotatable upon the shaft above the impeller, a housing upon the sleeve surrounding the impeller, said housing being open at its top and bottom and having inclined vanes at its upper end, cooperating clutch members upon the sleeve and the shaft, a reticulated basket for supporting articles to be cleaned, means for detachably connecting the basket to said housing and supporting means in the lower portion of the receptacle for supporting the basket in position to hold said clutch members out of engagement.

6. A cleaning machine comprising a receptacle for holding liquid, a vertical shaft located in said receptacle, means for rotating said shaft, an impeller upon the lower end of the shaft, a sleeve journalled upon the shaft, means fixed upon the sleeve surrounding the impeller, a reticulated basket for supporting articles to be cleaned, means for detachably connecting the basket to said means fixed upon the sleeve, means in the receptacle for holding the basket in stationary position, a pinion upon the shaft, a gear wheel upon the sleeve, a countershaft movable toward and from the first named shaft, a gear on the countershaft arranged to mesh with the pinion on the first named shaft, a pinion on the countershaft arranged to mesh with the gear on the sleeve, and means for moving the countershaft to engage or disengage said pinions and gear wheels.

7. A cleaning machine comprising a receptacle for holding liquid, a vertical shaft located in said receptacle, means for rotating said shaft, an impeller upon the lower end of the shaft, a sleeve journalled upon the shaft, means fixed upon the sleeve surrounding the impeller, a reticulated basket for detachably connecting articles to be cleaned, means for detachably connecting the basket to said means fixed upon the sleeve, means in the receptacle for holding the basket in stationary position, and means for operatively connecting the sleeve with the shaft for rotating the sleeve.

8. A cleaning machine comprising a receptacle for holding liquid, means for supporting an article to be cleaned in the liquid, an impeller located a substantial distance above the article supporting means so as to be located entirely above the article supported thereby, positive means for preventing contact of the impeller and the article, means for rotating the impeller relative to the article supporting means to circulate liquid through and around the article supported by said article supporting means, and means for raising the article supporting means above the liquid level in the receptacle and for rotating the article supporting means in the raised position.

9. A cleaning machine comprising a receptacle for holding liquid, a vertical shaft located in said receptacle, means for rotating said shaft, an impeller upon the lower end of the shaft, a sleeve journalled upon the shaft, means fixed upon the sleeve and surrounding the impeller, means for supporting articles to be cleaned, means for detachably connecting the article supporting means to said means fixed upon the sleeve, means for holding the article supporting means in stationary position below the liquid level in the receptacle and means for operatively connecting the sleeve with the shaft for rotating the sleeve.

10. A cleaning machine comprising a receptacle for holding liquid, a basket including a reticulated receptacle portion for supporting articles to be cleaned, means for holding the basket in stationary position below the liquid level in the receptacle, an impeller located above the top of the reticulated receptacle portion of the basket so as to be located entirely above the articles therein, positive means for preventing contact of the impeller and the articles, means for actuating the impeller to circulate liquid through the basket, and means for raising the basket above the liquid level in the receptacle and for rotating the basket in the raised position.

11. A cleaning machine comprising a receptacle for holding liquid, a reticulated basket for supporting articles to be cleaned, a cover for the basket, means for holding the basket in stationary position below the liquid level in the receptacle, an impeller located above the cover of the basket, means for actuating the impeller to circulate liquid through the basket, and means for raising the basket above the liquid level in the receptacle and for rotating the basket in the raised position.

12. A cleaning machine comprising a receptacle for holding liquid, a reticulated basket for supporting articles to be cleaned in said liquid, a cover for the basket, an impeller located above the cover of the basket adapted to circulate liquid through the basket, means for rotating the impeller relative to the basket to circulate liquid through the basket, and means for raising the basket above the liquid level in the receptacle and for rotating the basket in the raised position.

13. A cleaning machine comprising a receptacle for holding liquid, a vertical shaft located in said receptacle, means for rotating the shaft, an impeller upon the lower end of the shaft, a sleeve surrounding the shaft and rotatable relative thereto, means fixed upon the sleeve and surrounding the impeller, means for supporting articles to be cleaned, means for detachably connecting the article supporting means to said means fixed upon the sleeve, means for holding the article supporting means in stationary position below the liquid level in the receptacle and means for operatively connecting the sleeve with the shaft for rotating the sleeve.

14. A cleaning machine comprising a receptacle for holding liquid, a reticulated basket for supporting articles to be cleaned, means for holding the basket in stationary position below the liquid level in the receptacle, an impeller located a substantial distance above the bottom of the basket so as to be located entirely above the articles therein, positive means for preventing contact of the impeller and the articles, means for actuating the impeller to circulate liquid through the basket, and means for raising the basket above the liquid level in the receptacle and for rotating the basket in the raised position.

15. A cleaning machine comprising a receptacle for holding liquid, a basket having a reticulated cup shaped receptacle portion for supporting articles to be cleaned, a stand for holding the basket in stationary position below the liquid level in the receptacle, an impeller located a substantial distance above the reticulated cup shaped receptacle portion so as to be located entirely above the articles therein, positive means for preventing contact of the impeller and the articles, means for actuating the impeller to circulate liquid through the basket, and means for removing the basket from the stand and raising it above the liquid level in the receptacle and for rotating the basket in the raised position.

16. A cleaning machine comprising a receptacle for holding liquid, a basket having a reticulated receptacle portion for supporting articles to be cleaned, a stand for holding the basket in stationary position below the liquid level in the receptacle, cooperating means on the stand and the receptacle for holding the stand against relative movement in the receptacle, an impeller located entirely above the top of the reticulated receptacle portion, positive means for preventing contact of the impeller and the articles, means for actuating the impeller to circulate liquid through the basket, and means for raising the basket from the stand and raising it above the liquid level in the receptacle and for rotating the basket in the raised position.

17. A cleaning machine comprising a receptacle for holding liquid, a basket having a reticulated receptacle portion for supporting articles to be cleaned, a stand for holding the basket in stationary position below the liquid level in the receptacle, vertical vanes upon the stand and cooperating means in the interior of the receptacle for holding the stand against relative movement in the receptacle, an impeller located entirely above the top of the reticulated receptacle portion, means for actuating the impeller to circulate liquid through the basket, and means for removing the basket from the stand and raising it above the liquid level in the receptacle and for rotating the basket in the raised position.

18. A cleaning machine comprising a receptacle for holding liquid, a basket having a reticulated receptacle portion for supporting articles to be cleaned, a stand for holding the basket in stationary position below the liquid level in the receptacle, said stand comprising a ring which receives the basket and vertical vanes upon the exterior of the ring for supporting the ring above the bottom of the receptacle, an impeller located entirely above the top of the reticulated receptacle portion, means for actuating the impeller to circulate liquid through the basket, and means for raising the basket from the stand and raising it above the liquid level in the receptacle and for rotating the basket in the raised position.

19. A cleaning machine comprising a receptacle for holding liquid, a basket having a reticulated receptacle portion for supporting articles to be cleaned, a stand for holding the basket in stationary position below the liquid level in the receptacle, an impeller located entirely above the top of the reticulated receptacle portion, positive means for preventing contact of the impeller and the articles, means for actuating the impeller to actuate liquid through the basket, and means for raising the basket from the stand and raising it above the liquid level in the receptacle and for rotating the basket in the raised position.

CLARENCE R. MOSER.